(12) United States Patent
Liu

(10) Patent No.: US 7,089,128 B2
(45) Date of Patent: Aug. 8, 2006

(54) CONTROL CIRCUIT OF A DC FAN MOTOR FOR START WITH HIGH VOLTAGE AND HIGH ROTATIONAL SPEED WITH LOW VOLTAGE

(75) Inventor: Meng-Chih Liu, Taipei (TW)

(73) Assignee: Asia Vital Component Co., Ltd., Kaohsiung (TW)

( * ) Notice: Subject to any disclaimer, the term of this patent is extended or adjusted under 35 U.S.C. 154(b) by 0 days.

(21) Appl. No.: 10/948,243

(22) Filed: Sep. 24, 2004

(65) Prior Publication Data

US 2006/0074575 A1 Apr. 6, 2006

(51) Int. Cl.
*G01R 19/00* (2006.01)

(52) U.S. Cl. .......................................... 702/64; 702/189
(58) Field of Classification Search .................. 702/64, 702/65, 193, 182, 189; 318/254
See application file for complete search history.

(56) References Cited

U.S. PATENT DOCUMENTS

| | | | |
|---|---|---|---|
| 6,392,372 B1* | 5/2002 | Mays, II | 318/254 |
| 6,545,438 B1* | 4/2003 | Mays, II | 318/254 |
| 6,577,031 B1* | 6/2003 | Morooka et al. | 310/68 R |
| 6,731,082 B1* | 5/2004 | Pelonis | 318/254 |
| 6,741,049 B1* | 5/2004 | Kawaji et al. | 318/254 |
| 6,879,120 B1* | 4/2005 | Xi | 318/254 |
| 2002/0197068 A1* | 12/2002 | Xi | 388/825 |
| 2003/0011332 A1* | 1/2003 | Mays, II | 318/254 |
| 2003/0071589 A1* | 4/2003 | Xi et al. | 318/254 |
| 2003/0205975 A1* | 11/2003 | Xi et al. | 318/254 |
| 2004/0104696 A1* | 6/2004 | Oe | 318/254 |
| 2004/0189222 A1* | 9/2004 | Xi et al. | 318/254 |

* cited by examiner

*Primary Examiner*—Carol S. W. Tsai
*Assistant Examiner*—Anthony Gutierrez

(57) ABSTRACT

A control circuit of a DC fan motor for start with high voltage and high rotational speed with low voltage at least includes an input unit, an output unit, a control unit and a comparator. The input unit is connected to the comparison unit and the control unit for the power being inputted to operate the control circuit. The output unit has motor coil sets to be connected to the control unit such that the output unit can be driven by way of being controlled with the control unit. The comparison unit is connected to the control unit to control output current of the control unit. Hence, while the motor starts in a condition of being high voltage, the control element can prevent from being burned out due to excessively large current. Further, the motor fan can maintain a high constant rotational speed with low voltage output to enhance capability of heat dissipation and power saving.

1 Claim, 5 Drawing Sheets

CONTROL CIRCUIT OF A DC FAN MOTOR FOR START WITH HIGH VOLTAGE AND HIGH ROTATIONAL SPEED WITH LOW VOLTAGE

BACKGROUND OF THE INVENTION

1. Field of the Invention

The present invention is related to a control circuit of a DC fan motor for start with high voltage and high rotational speed with low voltage and particularly to a control circuit preventing the control element of a motor from damage.

2. Brief Description of the Related Art

Due to highly developed information technology in our society, it is a required function of the electronic product that a great deal of electronic data can be transmitted and treated effectively. However, a side effect of occurring a phenomenon of generating high temperature always comes with the function. Hence, it is necessary for the electronic product to provide a heat dissipation apparatus with excellent performance and needing less power in order to solve the problem of heat dissipation.

Currently, the cooling fan and the radiator are heat dissipation apparatuses available on the market. The former helps to dissipate heat by way of convection and the latter helps to dissipate heat by way of conduction. Because forced heat dissipation created with the cooling fan provides better effect, the cooling fan is kept being developed by all suppliers unceasingly.

Referring to FIG. 1, a conventional circuit of a fan motor includes a motor 11 and a driving unit 12. The motor 11 includes at least a first coil set 111 and a second coil set 112. The driving unit 12 is connected to the motor 11 and at least includes a driving element 121 and a Hall element 122. The Hall element 122 senses magnetic pole changes of a rotor in the motor 11 to generate positive voltage H+ and negative voltage H– outputting to corresponding pins in the driving element 121. The driving element 121 has a first output pin 1211 connecting with the first coil set 111 and has a second output pin 1212 connecting with the second coil set 112 for actuating the motor 11 to run with a proper rotational speed.

However, the preceding conventional circuit has problems in practice. Once the conventional circuit has been made completely in accordance with the original design, performance of the motor 11 is unchangeable except redesign. That is, the input voltage has a proportional relation to the rotational speed of the motor as the T1 curve shown in FIG. 2. For instance, when the motor 11 starts with the input voltage of 12 volts, the rotational speed of the DC fan motor 11 is 4,000 rpm and when the motor 11 runs with the input voltage of 4 volts, the rotational speed of the DC fan motor is 1,000 rpm. Under this circumstance, the rotational speed with the low input voltage becomes a little too low and it is not possible to attain the required efficiency of heat dissipation.

In order to increase the rotational speed with the same low input voltage, the coil sets were redesigned to allow the DC fan motor 11 provides a rotational speed of 2,300 rpm with input voltage of 4 volts as T2 curve shown in FIG. 2. However, the high input voltage leads to increased rotational speed as well, i.e., the high input voltage of 12 volts results in higher rotational speed of 8,000 rpm as T2 curve shown in FIG. 2. Higher rotational speed means increasing current and the phenomenon of burned-out can occur easily if the increased current exceeds an acceptable range of current, which is capable of being endured with the driving element 121.

SUMMARY OF THE INVENTION

An object of the present invention is to provide a control circuit of a DC fan motor for start with high voltage and high rotational speed with low voltage with which the power can be saved and the heat dissipation effect can be enhanced.

Another object of the present invention is to provide a control circuit of a DC fan motor for start with high voltage and high rotational speed with low voltage with which the fan motor can provide high rotational speed with low output voltage, that is, the driving current can be kept in a range of safety values during the fan running to prevent the fan motor from damage resulting from excessively large current during being started to burn out the control element.

Accordingly, the control circuit of a DC fan motor for start with high voltage and high rotational speed with low voltage according the present invention at least includes an input unit, an output unit, a control unit and a comparison unit. The input unit is connected to the comparison unit and the control unit for the power being inputted to operate the control circuit. The output unit has motor coil sets to be connected to the control unit such that the output unit can be driven by way of being controlled with the control unit. The comparison unit is connected to the control unit to control output current of the control unit. Hence, while the motor starts in a condition of being high voltage, the control element incapable of being burned out due to excessively large current. Further, the motor fan can maintain a high constant rotational speed with low voltage output to enhance capability of heat dissipation and power saving.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
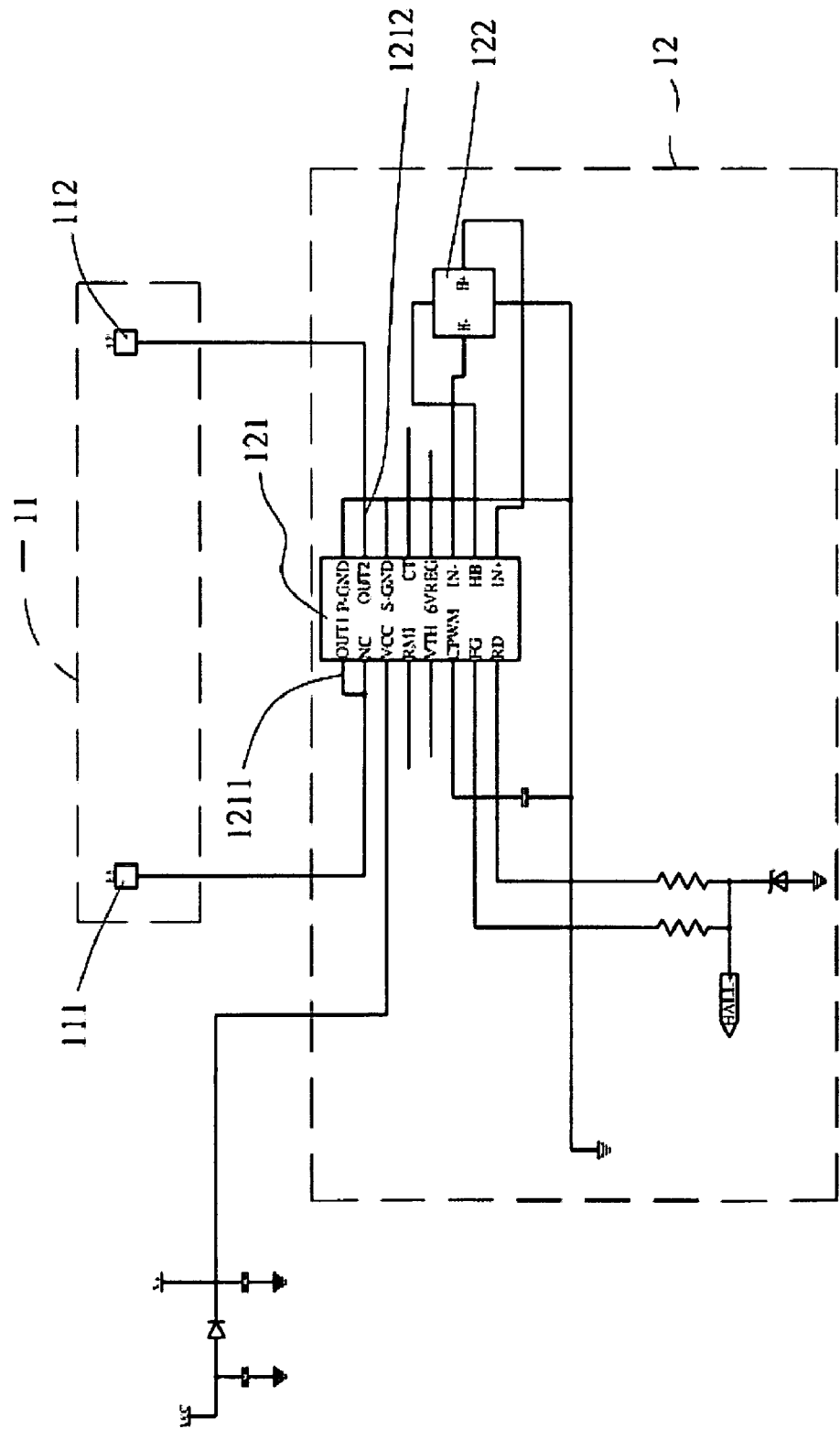
FIG. 1 is a conventional circuit diagram of a fan.
Figure 2:
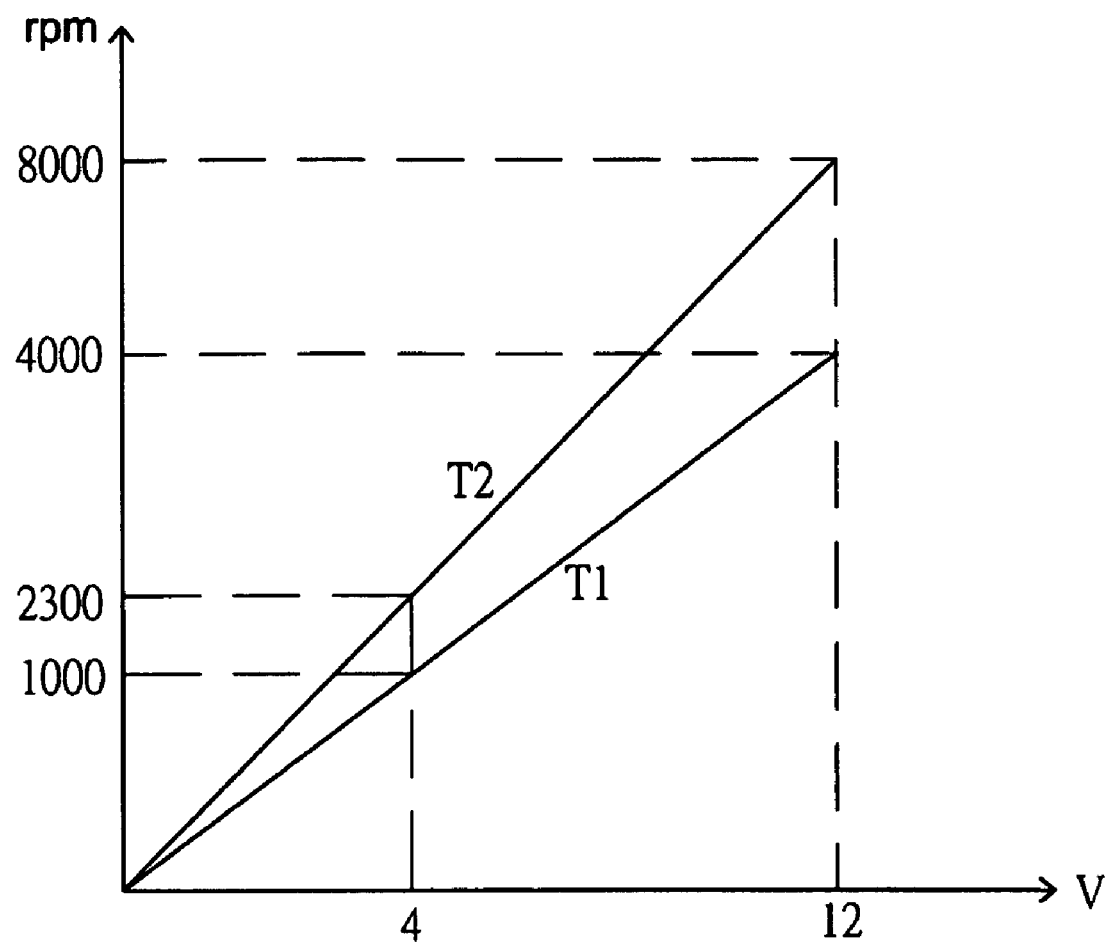
FIG. 2 is a graph illustrating characteristic curve of a conventional fan motor.
Figure 3:
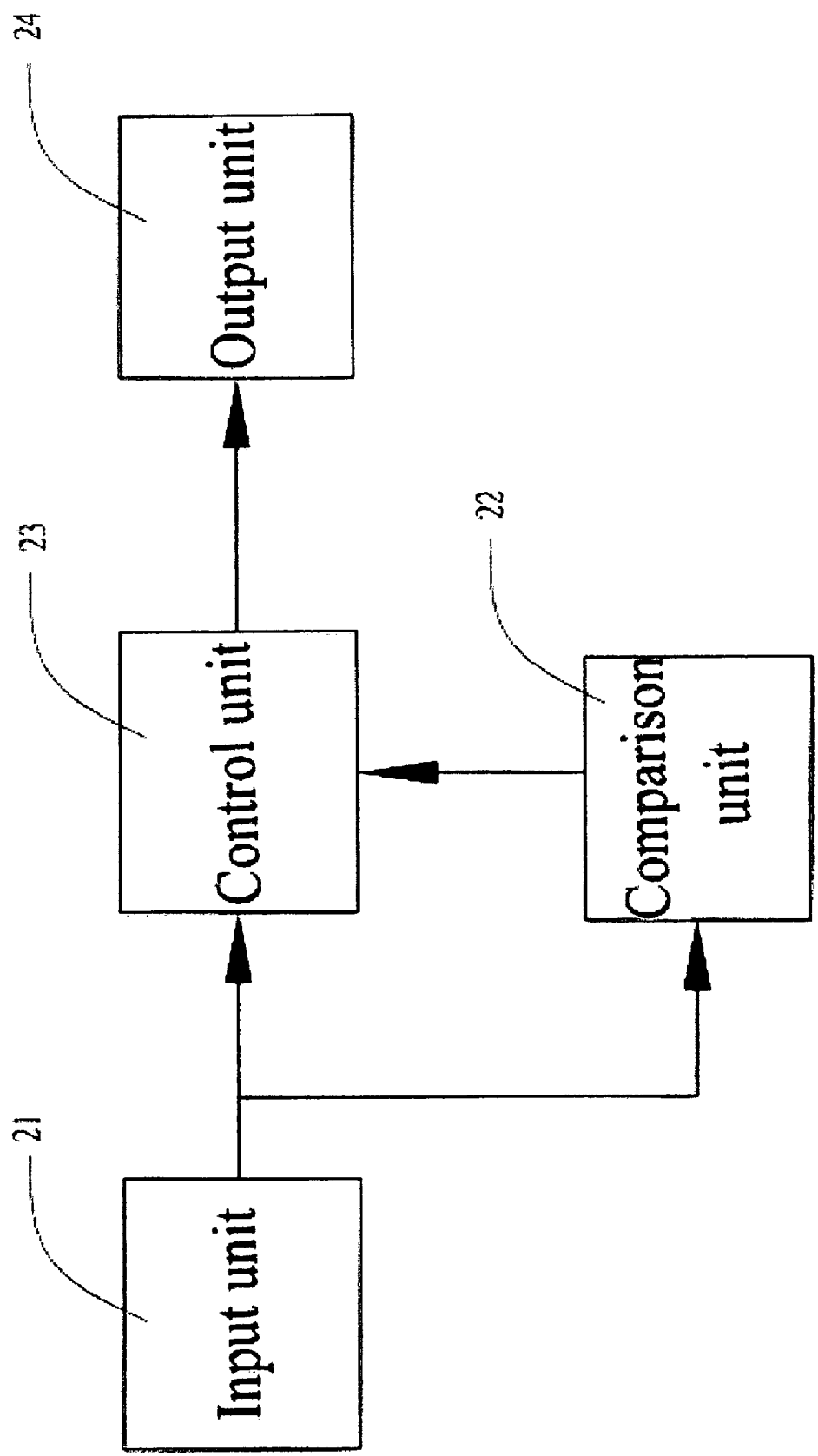
FIG. 3 is a block diagram of circuit according to the present invention in a preferred embodiment thereof.

Referring to FIG. 3, it can be seen in the block diagram that the control circuit of a DC fan motor for start with high voltage and high rotational speed with low voltage according to the present invention at least includes an output unit 24, a control unit 23 connected to the output unit 24 directly, a comparison unit 22 connected to the control unit 23 for controlling output current of the control unit 23, and an input unit 21 connected to the control unit 21.

Figure 4:
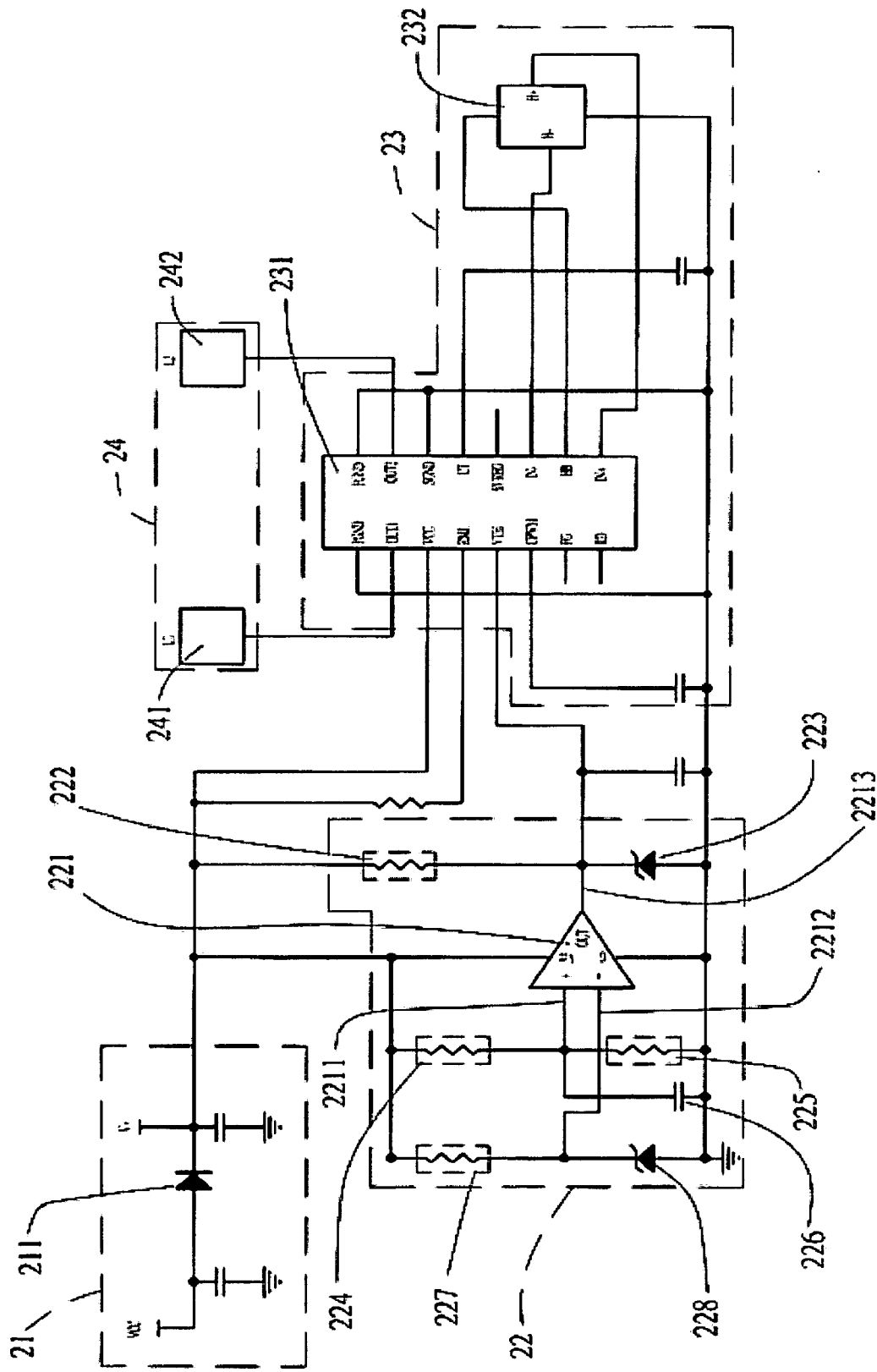
FIG. 4 is a circuit diagram of the preferred embodiment according to the present invention.

Referring to FIG. 4 in company with FIG. 3, the circuit of the preferred embodiment according to the present invention is illustrated. The output unit 24 at least includes a first motor coil set 241 and a second motor coil set 242. The control unit 23 at least includes a control element 231 and a Hall element 232. The Hall element 232 can sense the magnetic pole changes of a rotor in the control unit 24 to generate positive output voltage H+ and negative output voltage H– and the Hall element 232 is connected to the IN+ pin and IN− pin of the control element 231 and is connected to the comparison unit 22 for powering input corresponding to the positive output voltage H+ and the negative output voltage H− respectively. The control element 231 has a first output pin OUT1 connected to the first motor coil set 241 and has a second output pin OUT2 connected to the second motor coil set 242 so as to control and actuate the output unit 24. The comparison unit 22 at least includes a comparator 221 (or an operation amplifier) and the comparator 221 has a positive phase input end 2211, a negative phase input end 2212 and an output end 2213. The output end 2213 is connected to a VTH pin of the control element 231 and a resistor 222 and a stabilizing element 223 are provided between the output end 2213 and the VTH pin. The resistor 222 at one end thereof is for inputting DC power source and another end thereof is connected to the output end 2213. The stabilizing element 223 at one end thereof is grounded and another end thereof is connected to the output end 2213. The positive phase input end 2211 is connected to a resistor 224, a resistor 225 and a capacitor 226 and the resistor 224 at one end thereof is for inputting the DC power Source and at another end thereof is connected to the positive phase input end 2211. Further, the resistor 225 at one end thereof is grounded and another end thereof is connected to the positive phase input end 2211 and the capacitor 226 at one end thereof is grounded and at another end thereof is connected to the positive phase input end 2211. The negative phase input end 2212 is connected to a resistor 227 and a stabilizing element 228 and the resistor 227 at one end thereof is inputted with the DC power source and at another end thereof is connected to the negative phase input end. 2212. The stabilizing element 228 at one end thereof is grounded and at another end thereof is connected to the negative phase input end 2212, that is, the negative phase input end 2212 of the comparator 221 receives branch voltage signal consisting of the resistor 227 and the stabilizing element 228 and the preceding stabilizing elements 223, 228 can be Zener diodes.

The input unit 21 is provided for being inputted with an input power source Vcc and includes a reversed voltage protect diode 211 to connect with the comparison unit 22 and the control unit 23 for admitting the DC power source.

When the power source Vcc inputs via the input unit 21, the current can transmitted to the comparison unit 22 and the control unit 23 via the reversed voltage protect diode 211. The resistors 224 and 225 of the positive phase input end 2211 in the comparator 221 generate branch voltage signal for being received by the capacitor 226 to perform charging and discharging such that the voltage signal inputted via the positive phase input end 2211 can vary in a range of constant values. When the signal at the positive phase input end 2211 is less than branch voltage signal of the negative phase input end 2212, the output end 2213 of the comparator 221 generates a negative phase signal and the control element 231 resists the driving signal (driving current) from being sent to the output unit 24 in case of the VTH pin of the control element 231 receiving the negative phase signal.

When the input signal at the positive phase input end 2211 is greater than the branch voltage signal at the negative phase input end 2212, the output end 2213 of the comparator 221 generates a positive phase signal and the fan motor starts with high voltage in case of a large difference between the positive phase signal and the negative phase signal being provided. Due to the outputted positive phase signal being large, the stabilizing element 223 stabilizes the positive phase signal in a range of constant voltages by way of the function of branch voltage of the resistor 222 and stabilizing element 223 at the output end 2213. When the VTH pin of the control element 231 receives positive phase signal, a driving signal (driving current) can be sent to the first coil set 241 and the second coil set 242 via the first output pin OUT1 and the second output pin OUT2 so as to actuate the output unit 24 rotating with high speed.

When the difference between the input voltage signal at the positive phase input end 2211 and the input voltage at the negative phase input end 2212 is small, the fan motor rotates with low voltage and the output positive phase signal has low voltage. Due to function of the branch voltage of the resistor 222 and the stabilizing element 223, the stabilizing element 223 stabilizes the positive phase signal in a range of constant voltages. When the VTH pin of the control element 231 receives positive phase signal, the current is sent to the first coil set 241 and the second coil set 242 via the first output pin OUT1 and the second output pin OUT2 so as to allow the output unit 24 rotating with constant speed.

Figure 5:
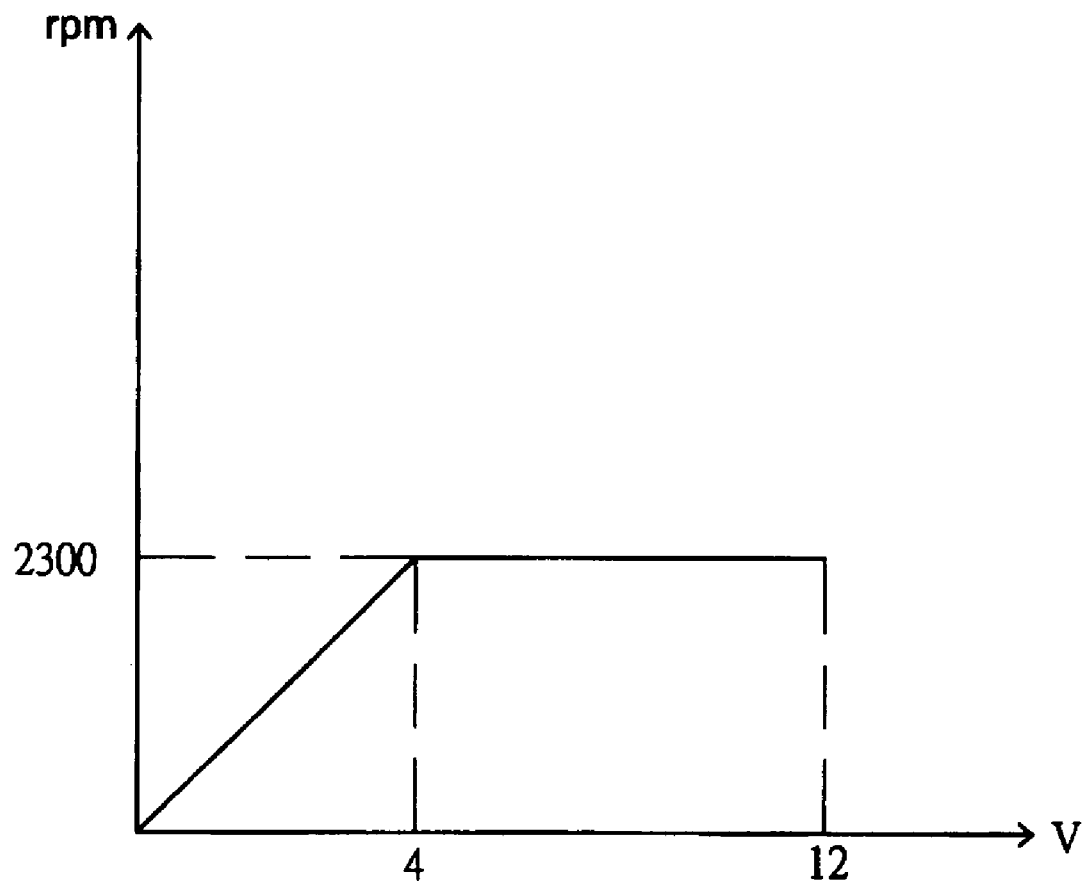
FIG. 5 is a graph illustrating characteristic curve of the preferred embodiment according to the present invention.

Referring to FIG. 5 in company with FIG. 4, an example of the preferred embodiment according to the present invention is illustrated. When the fan motor is started with the high output voltage of 12 volts and rotates with the low output voltage of 4 volts, the comparison unit 22 generates a constant positive phase signal, which is sent to the VTH pin of the control element 23l, and it results in output currents, which are sent to the first and second coil sets of the output unit 24 via the first output pin OUT1 and the second output pin OUT2 of the control element 231, are kept the same regardless the fan motor is started or in a state of running. In this way, the rotational speed of the output unit 24 is capable of keeping a constant of 2,300 rpm as shown in FIG. 5 to overcome the problem of excessive load resulting from high rotational speed with low voltage output. Further, advantages such as lowering power consumption and enhancing efficiency of heat dissipation are capable of being reached effectively.

While the invention has been described with referencing to a preferred embodiment thereof, it is to be understood that modifications or variations may be easily made without departing from the spirit of this invention, which is defined by the appended claims.

What is claimed is:

1. A control circuit for a DC fan motor being capable of keeping a high rotational speed constantly, which DC fan motor is started with high voltage and runs with low voltage, comprising:

an input unit, providing a reversed voltage protect diode and supply power to the circuit;

an output unit, providing at least a first motor coil set and a second motor coil set;

a control unit, providing a control element and a Hall element, wherein, the control element further comprises a plurality of pins and part of the pins connect with the input unit, the first and second motor sets and the Hall element;

characterized in that a comparison unit is provided to connect with the input unit and the control unit respectively and the comparison unit further comprises:

an operation amplifier, providing a positive phase input end, a negative phase end and an output end and the output end being connected to one of the pins in the control element;

a first resistor, being connected to the positive phase input end and connected to the input unit via the reversed voltage protect diode; and a second resistor, being disposed parallel to the first resistor, being connected to the negative phase input end and connected to the input unit via the reversed voltage protect diode too;

a third resistor, being connected to the positive phase input end to generate a positive phase input signal with the first resistor to enter the operation amplifier via the positive phase input end;

a first stabilizing element, being connected to the negative phase input end to generate a negative phase input signal with the second resistor to enter the operation amplifier via the negative phase input end;

a fourth resistor, being connected to the output end of operation amplifier to generate a branch voltage signal;

a second stabilizing element, being connected to the output end to stabilize a positive phase output signal of the operation amplifier before entering the control element; and a capacitor, being connected to the positive phase input end to perform charging and discharging for regulating the positive phase input signal being in a range of constant values;

wherein, when the positive phase input signal is greater than the negative phase input signal and a difference between the positive phase input signal and the negative phase input signal is large, the positive phase output signal is large such that a driving current is sent to the output unit for the output unit being started with a high speed once the control element receives the positive phase output signal; when the positive phase input signal is greater than the negative phase input signal but the difference between the positive phase input signal and the negative phase input signal is small, a small positive phase output signal is sent out by the operation amplifier and stabilized with the second stabilizer and the branch voltage signal before being sent to the control element such that the driving current is sent to the output unit for the output unit running with a speed same as the high speed constantly once the stabilized positive phase output signal is sent to the control element.

* * * * *